United States Patent [19]

Zicker

[11] Patent Number: 5,247,160
[45] Date of Patent: Sep. 21, 1993

[54] METHOD FOR TRANSMITTING CREDITCARD INFORMATION FOR A GROUP OF BUS PASSENGERS

[75] Inventor: Robert G. Zicker, Houston, Tex.

[73] Assignee: GTE Mobile Communications Service Corporation, Atlanta, Ga.

[21] Appl. No.: 899,819

[22] Filed: Jun. 16, 1992

Related U.S. Application Data

[63] Continuation of Ser. No. 672,988, Mar. 21, 1991, abandoned.

[51] Int. Cl.$^5$ .................... H04M 11/00; G06F 15/00
[52] U.S. Cl. ................................. 235/380; 235/375; 379/91
[58] Field of Search ............... 340/825.08, 825.10, 340/825.54, 825.3; 379/58, 56, 91, 144; 455/54, 66, 99, 54.1, 54.2; 235/380, 382, 382.5, 384, 375

[56] References Cited

U.S. PATENT DOCUMENTS

| | | | |
|---|---|---|---|
| 4,091,448 | 5/1978 | Clausing | 902/40 X |
| 4,776,003 | 10/1988 | Harris | 379/91 |
| 4,777,646 | 10/1988 | Harris | 379/91 |
| 4,845,740 | 7/1989 | Tokuyama et al. | 379/91 |
| 4,860,336 | 8/1989 | D'Avello et al. | 379/91 X |
| 4,965,821 | 10/1990 | Bishop et al. | 379/91 |

OTHER PUBLICATIONS

*TCL Terminal Control Language Programmer's Guide,* Verifone Part Number 00368 Rev. E, Manual Revision 6.0, Verifone Inc., 1988.

Primary Examiner—John Shepperd
Assistant Examiner—Edward H. Sikorski

[57] ABSTRACT

A system and method are disclosed for supplying a rental service provider such as a hotel or an automobile rental agency with advance printed notice of customers who are approaching the hotel or agency aboard a shuttle bus from a nearby airport, thereby enabling the hotel or agency to prepare rental agreements for the customers in advance of the customers' arrival. First, a credit card reader receives one or more credit cards and automatically reads the data contained thereon. A computer directs insertion of the data into a memory buffer and establishes a radio frequency communications connection with equipment at a remote location. The contents of the memory buffer are transmitted via the radio frequency connection to the remotely located equipment for printing, and the communications connection is automatically terminated after the printing of the data.

5 Claims, 5 Drawing Sheets

METHOD FOR TRANSMITTING CREDITCARD INFORMATION FOR A GROUP OF BUS PASSENGERS

This is a continuation of copending application Ser. No. 07/672,988 filed on Mar. 21, 1991 now abandoned.

BACKGROUND OF INVENTION

1. Field of Invention

The present invention relates generally to an improved method for initiating a rental agreement for an item such as a hotel room or an automobile. More particularly the invention relates to a system and software program for reading data contained on one or more credit cards, transmitting the data via a radio frequency channel, and printing the data at the location of the provider of the rental service.

2. Description of Prior Arrangements

Two of the most fundamental needs of travelers today are hotel rooms and rental vehicles. In order to pay for the rental of these items, many travelers utilize credit cards because of the many advantages that credit cards provide. For example, by utilizing credit cards, travelers can make a substantial number of purchases without requiring cash. Also, by utilizing credit cards travelers can enjoy the convenience of paying for a number of previously charged items on a monthly basis, upon receipt of itemized statements.

Another advantage afforded by use of credit cards is that credit cards are widely accepted for the purpose of reserving items such as hotel rooms and automobiles for subsequent rental. However, despite the convenience of reserving hotel rooms and automobiles with credit cards, there are still problems associated with entering into such rental agreements.

One of these problems is that providers of rental services typically do not prepare a customer's rental agreement prior to the arrival of the renting customer. This practice is common since potential customers having reservations for rental services occasionally change their plans so that they no longer require the rental services, but they neglect to cancel the reservations. As a result, rental service providers typically require customers to appear in person and wait while the rental agreement is prepared. After signing the prepared agreement, the rental service provider gives the customer keys to a hotel room, or in the case of an automobile rental, keys to an automobile.

There are a number of procedures that have been developed by rental service providers to solve this problem. In particular, some hotels or automobile rental agencies provide customers having reservations with a method of expedited rental agreement processing, typically called "express check-in". This program generally operates in conjunction with a shuttle bus, owned by the hotel or agency, that circulates between the hotel or agency and a nearby airport.

Under the express check-in program, a customer who has previously made a reservation boards a shuttle bus, which is bound for the hotel or agency, at the airport. The bus driver instructs the boarding customers who have previously made reservations for rental services to provide a credit card to the bus driver. Subsequently, the driver utilizes a two-way radio to contact an express check-in clerk of the hotel or agency, and the driver informs the clerk of the customers' names and credit card numbers. Upon receiving this data, the clerk prepares rental agreements for the arriving customers.

In the case of a hotel, when the customers arrive they can quickly complete their rental agreements by signing the agreements, whereupon their room keys are provided.

In the case of an automobile rental agency, agency employees prepare the automobiles for the arrival of the customers by unlocking the automobiles' doors, placing the prepared rental agreements in the automobiles corresponding to the agreements, placing the customers' names on tags which hang from the automobiles' rear view mirrors, and starting the automobiles' engines. When the customers arrive, they identify the automobiles assigned to them and drive their assigned automobiles to an exit booth of the rental agency. The customers are permitted to exit the rental lot by presenting their signed agreements and their credit cards to an employee stationed at the exit booth.

Although these programs can provide customers with expedited check-in for rental services, the programs have a number of limitations. In particular, if the bus driver's attention is occupied for some reason, the driver might not be able to process a customer's credit card before the bus arrives at the hotel or rental agency, and the customer will be required to wait for the preparation of his/her rental agreement. For example, the driver might not have an opportunity to read the card if the driver is navigating the bus through complicated city streets, or if the driver is driving in heavy traffic. Therefore, in order to provide more convenient express check-in service to customers, a system is needed for transmitting credit card data from a vehicle such as a shuttle bus to a remote site without assistance from the bus driver.

In addition to the problems of complicated navigation or heavy traffic, another factor that might affect the driver's ability to relay all customers' credit cards is the presence of a large number of customers requiring express check-in. Therefore, a system is needed to quickly receive the credit cards of a plurality of credit card holders and transmit the data contained thereon to a remote location.

Another disadvantage associated with the express check-in programs described above is that the programs might not be as safe as desired, since the programs require the driver to perform activities unrelated to driving the bus. As a result, it would be desirable from the standpoint of safety to have a system that transmits customers' credit card data to a remote site without requiring assistance from the bus driver.

A further disadvantage of these programs is that erroneous data is sometimes transmitted. For example, in attempting to simultaneously drive the shuttle bus and read credit cards over the radio, the driver might read data incorrectly. Therefore, it would be advantageous to have a system that reads customers' credit cards with an electronic card reader.

In addition to error that result from an incorrect reading by the bus driver, errors might result if the bus driver pronounces words poorly and/or if the person in radio communication with the driver misunderstands the driver's message. As a result, a computer-based system is needed to electronically enode credit card data and transmit the data to a remote location for electronic decoding and printing.

Furthermore, in addition to errors introduced by the driver, errors may be introduced by unreliable communications equipment. Accordingly, a system is needed that utilizes an error checking algorithm to ensure the integrity of the transmitted data.

BRIEF SUMMARY OF INVENTION

The present invention concerns a method and system for efficiently initiating services such as hotel check-in or car rental services. First, one or more credit cards are received by a credit card reader. Magnetically encoded data of the credit cards is automatically read and inserted into am emory buffer. After a communications connection is established with a remotely located printing device, the memory buffer contents are automatically transmitted to a remote location for printing. Finally, the communications connection is terminated.

DETAILED DESCRIPTION OF THE PREFERRED EMBODIMENT

Referring now to the drawings, a preferred embodiment of the invention will be described. The present invention generally provides an improved method for initiating the preparation of a rental agreement concerning an item such as a hotel room or an automobile. More specifically, the invention comprises a system and software program for reading data contained on one or more credit cards, transmitting the data via a radio frequency channel, and printing the data at the location of the rental service provider.

Figure 3:
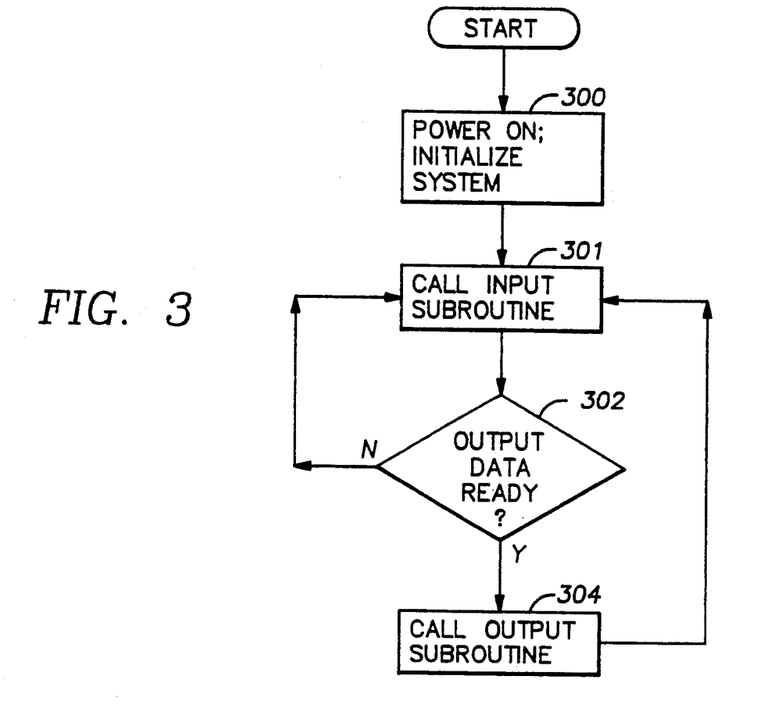
FIG. 3 is a simplified flowchart of the operation of the main program of the present invention.
Figure 4:
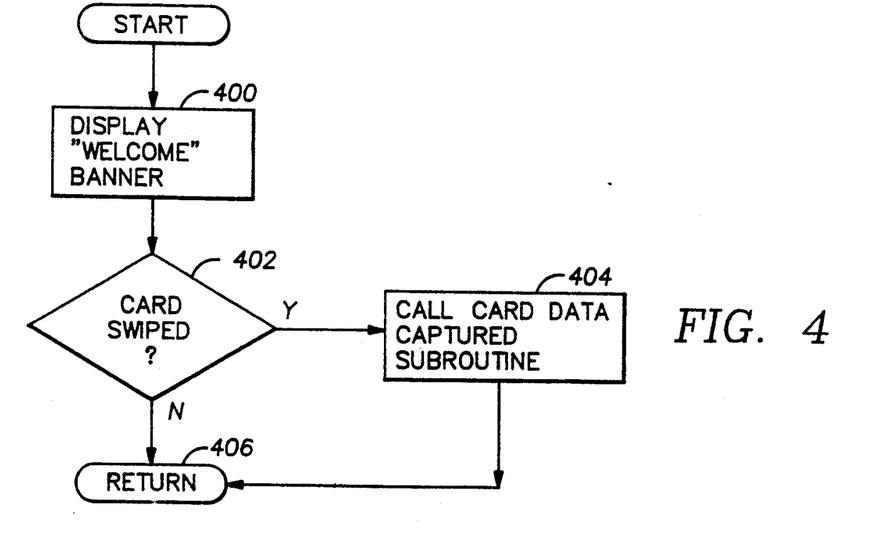
FIG. 4 is a simplified flowchart of the input subroutine of the present invention.
Figure 5:
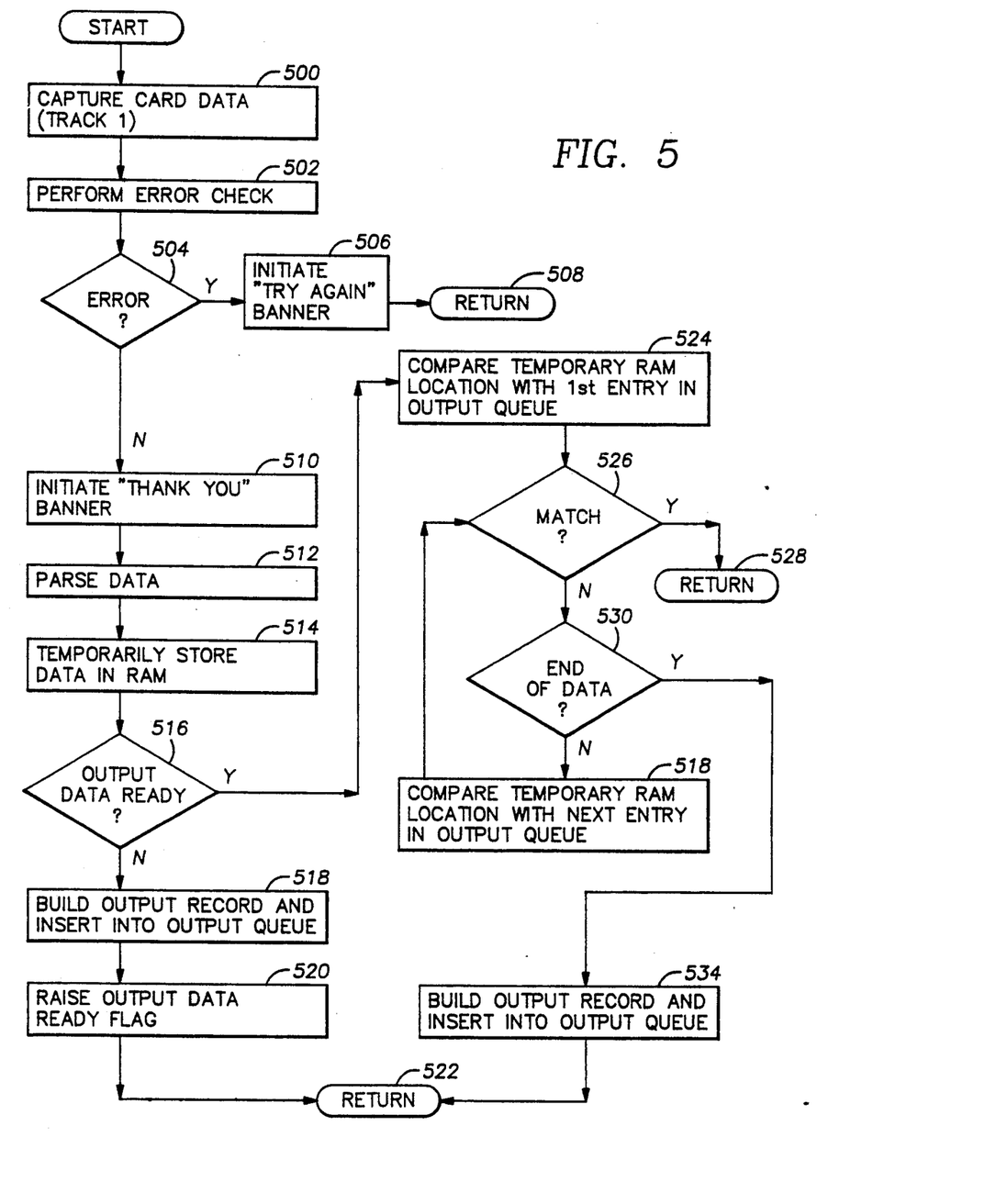
FIG. 5 is a simplified flowchart of the card data capture subroutine of the present invention.
Figure 6:
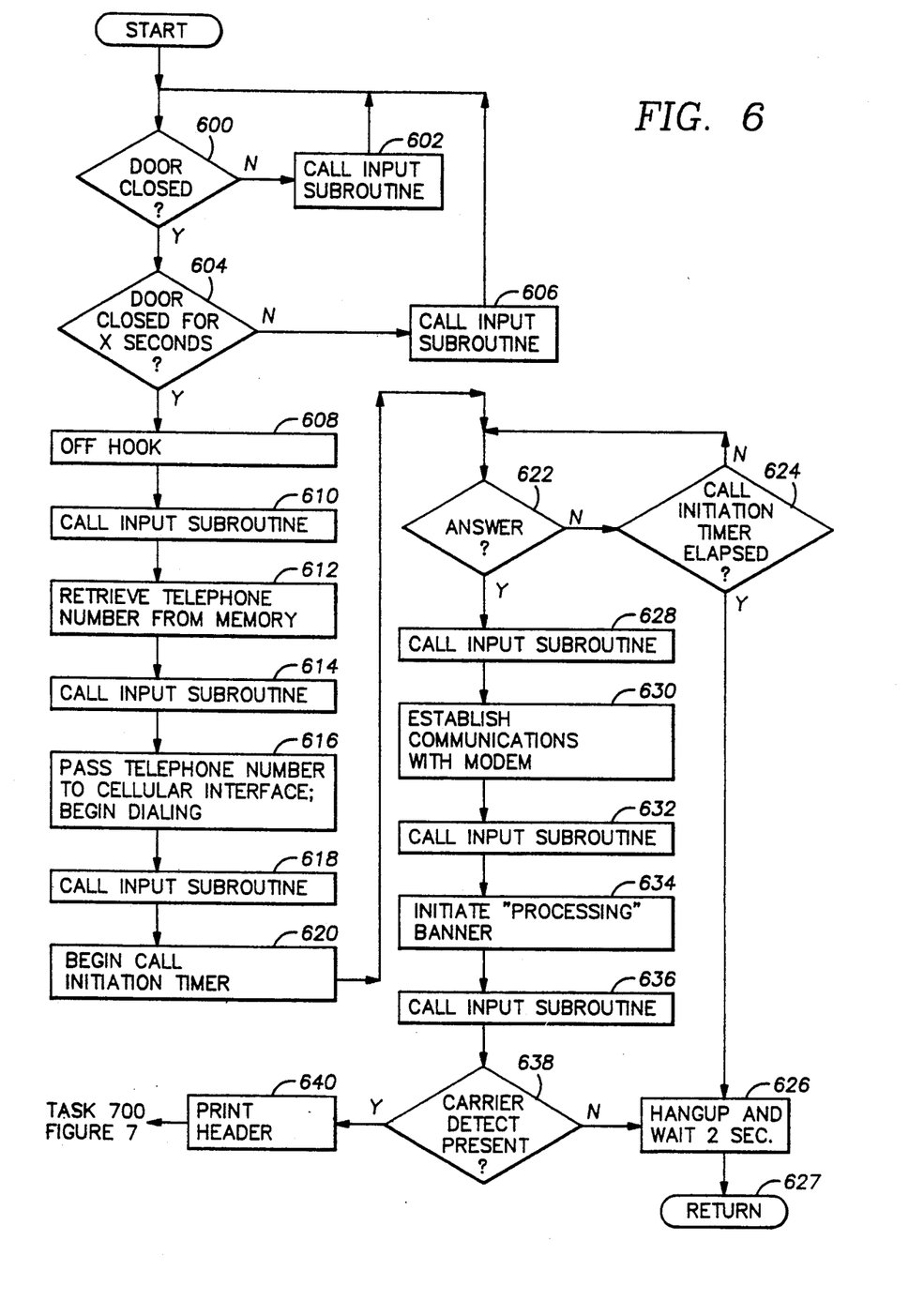
FIG. 6 is a simplified flowchart of a first portion of the output subroutine of the present invention.
Figure 7:
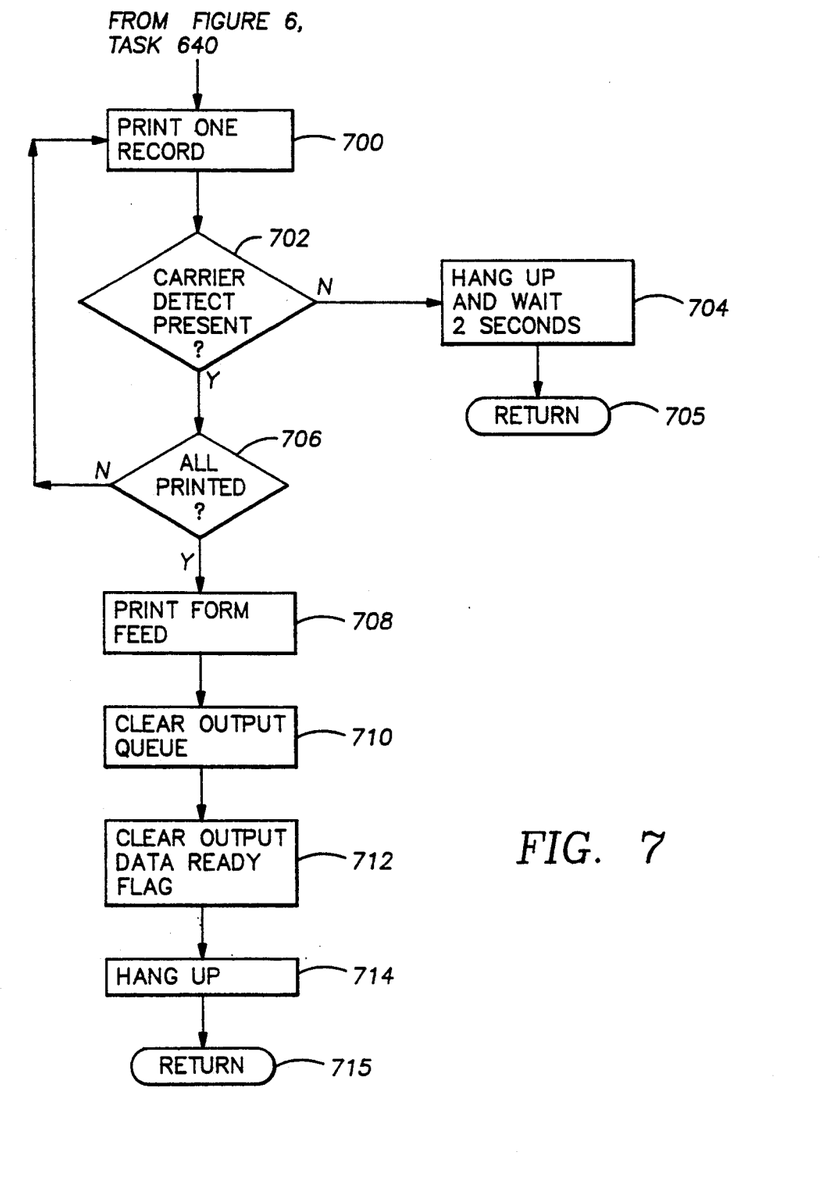
FIG. 7 is a simplified flowchart of a second portion of the output subroutine of the present invention.

The principle components of the method of the present invention include a main program, shown in FIG. 3; an input subroutine, shown in FIG. 4; a card data capture subroutine, shown in FIG. 5; and an output subroutine, shown in FIGS. 6 and 7.

Figure 1:
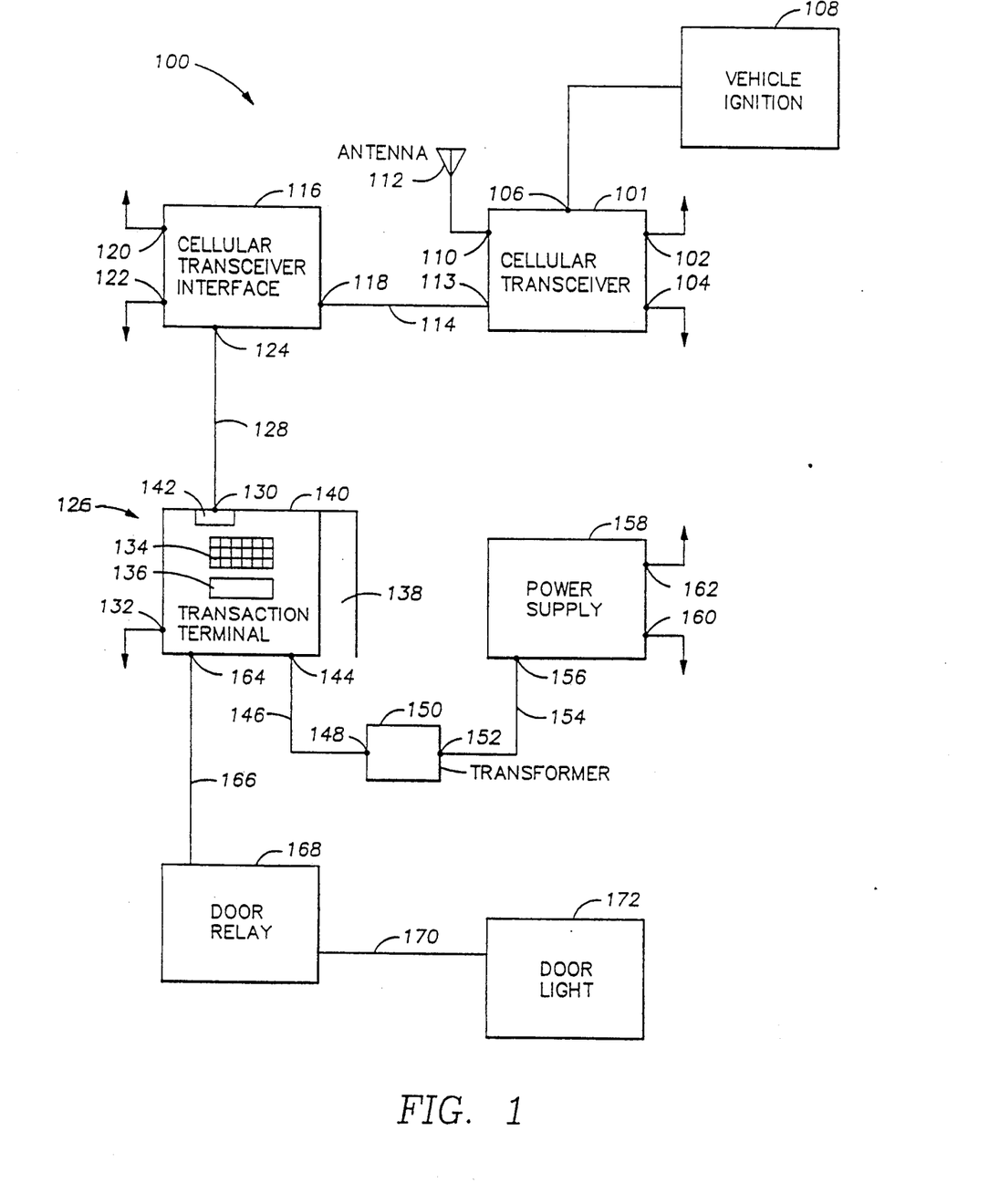
FIG. 1 is a drawing of the hardware interconnections of the mobile equipment of the present invention.
Figure 2:
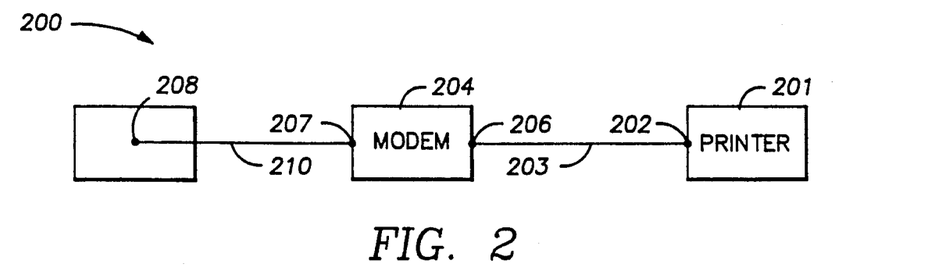
FIG. 2 is a drawing of the hardware interconnections of the fixed site equipment of the present invention.

The principle components of the hardware of the present invention include mobile equipment 100, shown in FIG. 1, and fixed site equipment, shown in FIG. 2. In the preferred embodiment, one or more identical configurations of the mobile equipment 100 are installed aboard one or more vehicles such as shuttle buses, not shown, which carry passengers from an airport to an establishment that provides rental services, such as a hotel or an automobile rental agency. Referring now to FIG. 1, the hardware components and interconnections that constitute a single configuration of the mobile equipment 100 will be described.

A principle component of the mobile equipment 100 is a cellular transceiver 101, which is an Oki model 23 transceiver in the preferred embodiment. The transceiver 101 is electrically attached at a transceiver power port 102 to 12 volt direct current power obtained from the battery, not shown, of the bus. The transceiver 101 is electrically attached to ground at a transceiver ground port 104. Additionally, the transceiver 101 is electrically attached at a transceiver ignition port 106 to a vehicle ignition 108, so that the transceiver 101 is activated when the vehicle ignition 108 is on. The transceiver 101 is also electrically attached at a transceiver antenna port 110 to a cellular antenna 112. At a transceiver data port 113 the transceiver 101 is electrically attached to a cable 114 which is connected to a cellular transceiver interface 116 via a first interface data port 118.

In the preferred embodiment, the interface 116 comprises an interface such as that described in U.S. Pat. Nos. 4,658,096, 4,737,975, and 4,775,997, or another interface that is capable of translating data between public switched telephone service-compatible signals and cellular transceiver signals. The interface 116 is electrically attached to 12 volt direct current power at an interface power port 120, and the interface 116 is connected to ground at an interface ground port 122. Interface 116 additionally has a second interface data port 124. The port 124 provides an RJ-11 type interface for sending and receiving signals that are compatible with a public switched telephone network. Furthermore, the port 124 is electrically attached to a transaction terminal 126 via an RJ-11 type cable 128 and a first terminal data port 130.

In the preferred embodiment, the terminal 126 comprises a Verifone model Trans 330 transaction terminal, which includes keypad 134; a display 136, such as a light emitting diode display; a credit card reader 138; a programmable microcomputer 140; and a telephone modem 142. Preferably, the terminal 126 is placed in a conspicuous location aboard the vehicle, so that passengers desiring express check-in services will promptly notice the display 136 and the card reader 138 when they board the vehicle.

The terminal 126 receives 9 volt alternating current power at a terminal power port 144 which is electrically attached via a cable 146 to a transformer output port 148 of a transformer 150. The transformer 150 receives 115 volt alternating current power at a transformer input port 152 which is electrically attached via a cable 154 to a power supply output port 156 of a power supply 158. The power supply 158 comprises a device such as a Statpower Technologies Corp. model PC100+power inverter, or another power supply capable of supplying an output of 115 volt alternating current power by utilizing an input of 12 volt direct current power. The power supply 158 is electrically attached to ground at a power supply ground port 160, and is electrically attached to 12 volt direct current power at a power supply input port 162.

The transaction terminal 126 is also electrically attached at a second terminal data port 164 to a door relay 168, via a cable 166. The door relay 168 is electrically attached via a cable 170 to a door light 172 of the vehicle. The door relay 168 includes a relay circuit, not shown, such as a Potter & Brumfield model T82 relay, coupled with an RS-232 transmitter/receiver, not shown, such as a Maxim MAX232 circuit. The door relay 168 functions to provide one of two possible electrical signals to the port 164 depending upon whether the door light 172 is on or off. The specific operation and interconnections of relay arrangements such as the door relay 168 are readily understood by those possessing ordinary skill in the art.

Reference will now be made to FIG. 2, which shows a number of hardware components and interconnections that constitute fixed site equipment 200 of the invention. In the preferred embodiment, the fixed site equipment 200 is installed at a fixed location such as a hotel reception desk or an exit booth of an automobile rental agency.

A principle component of the fixed site equipment 200 of the invention is a printer 201. In the preferred embodiment, the printer 201 comprises a serial printer such as a Verifone model 600 serial printer. The printer 201 includes a printer input port 202 which is electrically attached to a modem 204, via a modem output port 206 and a cable 203. The printer 201 receives electrical input signals in the form of RS-232 serial data from the modem output port 206.

The modem 204 is attached at an modem input port 207 to a telephone line 208, via an cable 210. The port 207, the telephone line 208, and the cable 210 are compatible with the RJ-11 standard. The line 208 is electrically attached to a public switched telephone network. The provision of normal landline telephone service, such as the service which is provided to the line 208, has been known for a considerable time and will not be discussed further.

Having described the hardware components and interconnections of the invention, the general operation of the invention will now be described. First, a passenger desiring express check-in service slides his/her credit card, not shown, into the credit card reader 138 which collects data that is contained on a magnetic strip, which is attached to the credit card. This sliding motion is commonly called "swiping" the credit card. The microcomputer 140 places the data into a predetermined format and causes the modem 142 to transmit dual tone multi-frequency dialing commands as well as the credit card data to the cellular transceiver interface 116.

The interface 116 translates the received dual tone multi-frequency dialing commands into a format which is compatible with the cellular transceiver 101, and thereafter transmits the dialing instructions and the data to the transceiver 101. The transceiver 101 then utilizes the antenna 112 to establish a cellular radiotelephone connection and to transmit the data through the cellular radiotelephone and landline telephone networks, not shown, to the telephone line 208. The data is received by the modem 204 whereupon the data is converted into RS-232 format data, and transmitted to the printer 201 for printing.

Having described the hardware equipment, interconnections, and general function of the invention, the operation of the equipment will now be described in more detail. Operation of the mobile equipment 100 of the invention is controlled by a software program contained in a non-volatile memory bank, not shown, of the transaction terminal 126 of the mobile equipment 100. The software program of the invention includes a number of Terminal Control Language programming lines which are stored and executed by the terminal 126. These programming lines are shown in order of execution in Table I hereinbelow. Terminal Control Language is documented in the TCL Terminal Control Language Programmer's Manual of Verifone Inc., part number 00368- Revision E, Manual Revision 6.0. The aforementioned manual is hereby incorporated by reference.

Generally, the software program functions to receive and store credit card data read by the card reader 138, and to send the stored data to the interface 116 for subsequent transmission to the transceiver 101 and the printer 201.

The software program of the invention will now be discussed more specifically with reference to FIG. 3. The initialization cycle of task 300 is automatically executed by the terminal 126 when the port 144 receives 9 volt alternating current power from the transformer 150. During the initialization mode of task 300, the keypad 134 is activated for a period of 10 to 15 seconds in order to permit an operator to enter a time, date, identification number of the terminal 126, and the telephone number of the telephone line 208. After the operator finishes entering the data, the data is stored in a non-volatile memory, not shown, of the terminal 126. Upon the storage of the data, the keypad 134 is automatically deactivated.

After task 300, the main program calls an input subroutine in task 301. The input subroutine generally determines whether credit card data has been read by the card reader 138, and if data has been read, the subroutine places the data into a random access memory location which will be referred to as the output queue. The output queue functions to collect entries of credit card data for subsequent transmittal to the interface 116. When the input subroutine returns control to the main program, query 302 determines whether the output queue contains any data. If the output queue is empty, control of the program returns to task 301 wherein the input subroutine is re-executed. However, if query 301 detects data in the output queue, an output subroutine is executed in task 304. The output subroutine generally functions to transmit the contents of the output queue to the printer 201.

Thus, the main program basically involves the steps of determining whether credit card data has been read and, if data has been read, placing the data in an output queue and transmitting the contents of the output queue to the printer 120.

In order to describe the input subroutine in more detail, reference will now be made to FIG. 4. Upon execution of the input subroutine by main program, task 400 issues an instruction to the microcomputer 140 of the terminal 126 causing the display 136 to exhibit a welcoming banner such as "WELCOME ABOARD, SWIPE YOUR CARD."

After task 400 initiates the exhibition of the welcome banner, query 402 determines whether a credit card has been swiped through the card reader 138. If the answer to query 402 is yes, then task 404 executes a card data capture subroutine. The card data capture subroutine basically checks the received credit card data for errors and inserts properly received credit card data into an output queue for subsequent transmission to the printer 201.

After a negative answer to query 402 or execution of task 404, task 406 returns control to the main program. The input routine typically requires a fraction of a second to completely execute.

With reference to FIG. 5, the card data capture subroutine will now be described in greater detail. As mentioned hereinabove, the card data capture subroutine is executed by the input subroutine after query 402 determines that a credit card has been swiped through the card reader 138. Accordingly, task 500 of the card data capture subroutine captures the data contained on the first track of the magnetic strip of the credit card that was swiped. This capturing operation is performed by temporarily placing the data in random access memory, not shown, of the microcomputer 140. Typically, a credit card's first track contains alphanumeric characters that represent information such as a name, account number, and expiration date associated with the card.

After completion of task 500, task 502 performs an error check, such as a longitudinal redundancy check, on the captured data. Query 504 then determines whether task 502 detected an error in the data. If an error was detected, task 506 instructs the microcomputer 140 to exhibit a banner such as "PLEASE TRY AGAIN" for a predetermined time period on the display 136, and task 508 returns control from the card data capture subroutine to the input subroutine.

On the other hand, if query 504 does not identify an error in the data, task 510 causes the microcomputer 140 to exhibit a banner such as "THANK YOU" for a predetermined time period. Then, task 512 places the data into a predetermined format by dividing the data into fields corresponding to the name, account number, and expiration date, and accordingly inserting field separation characters.

After the data is formatted in task 512, task 514 temporarily stores the formatted data in the random access memory, not shown, of the microcomputer 140. After the data is temporarily stored in the memory, query 516 determines whether the output queue contains data. The determination of query 516 is made by checking an output data ready flag, described hereinbelow, which is set when data is inserted into the output queue and cleared when the output queue is emptied. The existence of data in the output queue indicates that the data is ready to be sent to the interface 116 for subsequent transmittal by the transceiver 101. However, in order to prevent data from a single credit card from being transmitted twice during one data transmission, the data which is temporarily stored in memory in task 514 is compared to the contents of the output queue before adding the temporarily stored data to the output queue.

If query 516 detects data in the output queue, the program proceeds to task 524 wherein the data temporarily contained in memory is compared to the first entry in the output queue. Query 526 determines whether the temporary data matches the first entry of data in the output queue. If the data is equivalent, this means that the temporary data is duplicated in the output queue, so that the temporary data need not be added to the putput queue. Accordingly, in the case of matching data, control passes to task 528 which returns control to the input subroutine without adding the temporary data to the output queue.

On the other hand, if query 526 does not find a match between the temporary data and the first data entry of the output queue, query 530 determines whether the output queue entry compared in query 526 was the final output queue entry. If the answer to query 530 was no, indicating that more output queue entries require comparison to the temporary data, control of the program returns to task 532 wherein the temporary data is compared to the next entry of the output queue. After the comparison of task 532, query 526 determines whether a match was found. Likewise, the steps of query 526, query 530, and task 532 are repeated until the temporary data is determined to match an entry in the output queue or until the entire output queue is searched without locating a match.

In the event a match is found by query 526, task 528 returns control to the input subroutine. However, if the temporary data is not found in the output queue, the program advances to task 534 wherein the temporary data is reformatted for transmittal to the printer 201 and inserted into the output queue. The reformatting is performed in order to print a more understandable message at the printer 201, and includes the addition of text such as the date, time, identification number of the terminal 126, and the number of data entries in the output queue. After task 534, task 522 returns control to the input subroutine.

Alternatively, if query 516 determines that the output queue was empty, the steps 524–534 are not performed. Instead, control passes to task 518 wherein the temporary data is reformatted and inserted into the output queue. Then, task 520 sets the output data ready flag in order to indicate that the output queue now contains data. Finally, task 522 returns control to the input subroutine.

In summary, the card data capture subroutine functions to check the received credit card data for errors, place properly received credit card data into a predetermined format, and insert the formatted data into the output queue for later transmission to the printer 201.

Having now described the card data capture subroutine, the output subroutine will be described. In general, the output subroutine executes the commands necessary to establish a communications link between the mobile equipment 100 and the fixed site equipment 200, and additionally transmits the contents of the output queue after the communications link has been established.

A typical airport shuttle bus of a hotel or vehicle rental agency will make a number of stops at different airport gates in order to pick up and drop off passengers. During this period, the bus door opens and shuts frequently. After all stops have been completed, the bus will travel to the location of the hotel or agency, which is typically located some distance away from the airport. Under normal circumstances the bus door remains shut during the entire trip from the last pick-up or drop-off to the hotel or agency.

Therefore, by waiting until the bus door has been shut for a predetermined time period that is greater than the time taken by the bus to travel between stops, it is possible to determine a time at which it is highly probable that the bus is in route to the hotel or agency. Accordingly, at this time it is likely that all passengers interested in the express check-in service have already swiped their cards, since passengers desiring express check-in are likely to swipe their credit cards soon after boarding the bus in order to promptly initiate the check-in process and provide the hotel or agency employees with the greatest amount of time to prepare the proper rental agreement.

By determining the time at which all passengers have swiped their cards and no more passengers will be added to the bus, the data can be more efficiently transmitted to the printer 201 since at this time the data can be transmitted as a single unit during one communications connection.

In order to describe the operation of the output subroutine in greater detail, reference will now be made to FIGS. 6 and 7. The first step in the output subroutine involves determining in query 600 whether the shuttle bus door, not shown, is closed. This determination is made by the microcomputer 140 based upon the electrical signal present at the port 164. This electrical signal is supplied by the door relay 168 as discussed hereinabove, and the door relay 168 is, in the preferred embodiment, electrically attached to the door light 172 of the bus, not shown. In a typical shuttle bus, the door light 172 is automatically turned on when the door is opened, and turned off when the door is shut.

Accordingly, if query 600 determines that the door is open, the input subroutine is executed in task 602. Query 600 and task 602 repeat in this manner until query 600 determines that the door has closed, at which time query 604 determines whether the door has been closed for a predetermined time period. If the answer to query 604 is no, then task 606 executes the input subroutine and returns to query 600.

Query 604, task 606 and query 600 repeat in this manner as long as the door remains closed until the door has been closed for a predetermined time period, at which time the program initiates a communications link. In particular, in task 608 the microcomputer 140 sends the interface 116 an off hook command.

After task 608, task 610 executes the input subroutine. The input subroutine is frequently called, as described hereinbelow with reference to tasks 614, 618, 628, 632, and 636. These tasks permit the terminal 126 to accept and process additional credit cards that are swiped through the card reader 138 during the operation of the output subroutine. Since the input subroutine, as discussed previously, requires less than one second to execute, the operation of the output subroutine is not delayed significantly by such executions of the input subroutine.

After task 610 calls the input subroutine, task 612 retrieves the telephone number associated with the telephone line 208 from the memory of the microcomputer 140, where the number was stored previously in task 300. After task 612 is completed, task 614 calls the input subroutine.

Task 616 then sends the retrieved telephone number to the interface 116 in the form of dual tone multi-frequency digits, whereupon the interface 116 begins dialing the number. After task 616, task 618 calls the input subroutine. Subsequently, in task 620, a timer is started. The call initiation timer marks the time at which the dialing instruction was issued, and therefore provides an indication of the time used in establishing the call. If the call set-up time exceeds that which is normally used in establishing a call, then it is likely that a problem has occurred. Such problems could include, for example, receipt of a busy signal due to the telephone line 208 being in use, malfunction of the fixed site equipment, etc.

Accordingly, after task 620, query 622 determines whether the call has been answered, thereby establishing a communications link between the transceiver 101 and the line 208. If the call has not been answered, query 624 determines whether the call initiation timer has reached a predetermined limit. In the event this limit has not been reached, control returns to query 622. Thus, control of the program is passed between queries 622 and 624 as long as the call has not been answered and the call initiation timer has not elapsed.

If the call initiation timer elapses, the answer to query 624 becomes yes and task 626 causes the microcomputer 140 to issue a hang up instruction and to wait for two seconds. The two second wait is necessary in order to prevent the equipment 100 from attempting to place a new call before the aborted cellular connection has been fully terminated. After the two second wait, task 627 returns control to the main program. Although task 627 returns control to the main program without having transmitted the contents of the output queue to the fixed site equipment 200, another attempt at transmitting the data will be made when control returns to the main program, query 302 detects that the output data ready flag is set, and the main program calls the output subroutine in task 304.

The present invention is therefore able to facilitate calls from more than one vehicle equipped with the mobile equipment 100. Specifically, if the equipment of a first vehicle receives a busy signal due to a call of a second vehicle already in progress, the first vehicle will abort the call as described hereinabove and re-attempt to transmit the data later.

Alternatively, if query 622 determines that the call as been answered, then task 628 calls the input routine and task 630 establishes communications with the modem 204. Task 630 involves steps of synchronization, baud rate selection, and handshaking that are commonly performed by ordinarily skilled artisans in the area of data communication. After task 630, the input subroutine is again called in task 632.

At this point, task 634 issues an instruction to the microcomputer 140 of the terminal 126 causing the display 136 to exhibit a banner such as "PROCESSING" for a predetermined period of time in order to indicate to bus passengers that the mobile equipment 100 is communicating with the fixed site equipment 200. After display of the banner is initiated, task 636 calls the input routine for the final time during operation of the output subroutine.

In order to determine whether the communications link has been unintentionally terminated, query 638 checks for carrier detect. If carrier is no longer detected, task 626 executes and task 627 returns control to the main program. On the other hand, if the communications link has not been interrupted, task 640 transmits a header for printing at the printer 201. The header contains information that pertains to the batch of the credit cards to be transmitted, such as the date, time, number of entries in the output queue, and the identification number of the terminal 126 Accordingly, since the header lists the number of entries in the output queue, the input subroutine is not executed during the remainder of the output subroutine so that no more entries are added to the output queue.

After the header is printed, task 700 prints the first credit card record from the output queue. If query 702 determines that carrier detect is no longer present, task 704 hangs up and waits two seconds, and then task 705 returns control to the main program.

However, if the communications link is still intact, query 706 determines whether all records stored in the output queue have been printed. If all records have not been printed, task 700, query 702, and query 706 repeat until carrier is lost or until all records are printed. Once query 706 determines that all output queue records have been printed, then task 708 sends a form feed command to the printer 201. The form feed command causes one sheet of paper, not shown, of the printer 201 to be ejected so that the printed data may be more easily read by the clerk of the hotel or agency.

The output queue is cleared in task 710, and the output data ready flag cleared in task 712 in order to indicate that the output queue is empty. These steps do not occur until all output queue entries have been successfully printed. Thus, in the event the output subroutine terminates prematurely in tasks 626 or 704, the output queue remains intact so that it can be subsequently printed during the next execution of the output subroutine. Finally, task 714 hangs up, and task 715 returns control to the main program.

The present invention, then, provides an improved system and method for initiating the preparation of rental agreements relating to items such as hotel rooms or automobiles. The invention includes one or more configurations of the mobile equipment 100, which are installed aboard one or more vehicles such as shuttle buses. The invention also includes the fixed site equipment 200, which is located at a permanent location such as an automobile rental agency or a hotel. Each identical configuration of the mobile equipment 100 includes a transaction terminal 126, which is mounted aboard a bus in a location that is accessible to passengers as they enter the bus.

Accordingly, when passengers enter the bus, the passengers having express check-in reservations for the hotel or agency associated with the vehicle are alerted to the prominently located terminal 126. The display 134, which is attached to the terminal 126, exhibits a message such as "WELCOME ABOARD, SWIPE YOUR CARD", thereby encouraging express check-in passengers to insert their credit cards into the card reader 138, which is attached to the terminal 126.

After a passenger swipes his/her credit card through the card reader 138, the display 134 presents a message such as "THANK YOU". Then, the information from the credit card is stored in the memory of the terminal 126 and the terminal 126 awaits the insertion of the next passenger's card.

After the door of the bus remains closed for a predetermined time, the credit card data that has been collected is transmitted to the fixed site equipment 200 where the data is printed for subsequent utilization by hotel or agency personnel in preparing the proper rental agreements. As a result, the express check-in customers can quickly sign their pre-prepared rental agreements upon arrival at the hotel or agency.

The present invention provides a number of advantages to its users. In particular, the invention supplies a means for express check-in customers riding a shuttle bus to send data contained on their credit cards to a rental service provider such as a hotel or vehicle rental agency, so that employees of the hotel or agency can prepare rental agreements in advance of the customers' arrival. However, unlike the past arrangements, the present invention does not require the customers to part with possession of their credit cards. Thus, there is no possibility of a customer forgetting to retrieve his credit card after having handed the card to the bus driver.

Another advantage of the present invention is that the relaying of the credit card data is performed by electronic equipment and an associated software program and does not require participation of the bus driver. Therefore, the customers' credit cards are received and the data contained thereon is transmitted without regard to factors that have caused delay in prior arrangements such as the number of customers requiring service, heavy traffic, and navigation of complex streets. Therefore, an advantage of the present invention is that its operation is not affected by the degree to which the shuttle bus driver is occupied.

Another advantage of the invention is that, since the invention comprises an electronic system and associated software program, the invention eliminates the possibility of error introduced by the driver's incorrectly reading or pronouncing the credit card data. Similarly, the errors which might arise due to inaccurate receipt of the information transmitted by the driver are obviated for the same reason.

Yet another advantage afforded by the present invention is that the invention operates more safely than past arrangements since there is no longer a need for the bus driver to simultaneously drive the bus and relay credit card information.

While there have been shown what are at present considered to be preferred embodiments of the invention, it will be apparent to those skilled in the art that various changes and modifications can be made herein without departing from the scope of the invention as defined by the appended claims.

TABLE I

```
; PROGRAM NAME = HERTZ.SRC
; CREATION DATE = 09/25/89
; LAST UPDATE = 10/26/89
; AUTHOR = ROBERT G. ZICKER
; COPYRIGHT (C) 1989 GTE MOBILE COMMUNICATIONS GROUP
;          "HERE COMES" TRANZ 330 SOFTWARE
; This package will be downloaded to the TRANZ 330 card
; readers to allow them to capture and store the GOLD
; CARD track 1 data for HERTZ.
; This collection of data will continue until 10 seconds after
; the doors close on the HERTZ bus. At that time, this
; collected data will be offloaded via a cellular telephone
; call to the GOLD BOOTH printer.
; The TRANZ 330 card reader has an internal modem which will
; be used for the offload of collected data. The format of
; the offload records is:
; WEEKDAY DATE TIMEcr/lf
; BUS # cr/lf
; MEMBER COUNT cr/lf (HEADER RECORD)
; ACCOUNT CUSTOMER'S NAME EXP DATEcr/lf
; WHITE SPACE SEPARATOR
; SATURDAY 10/21/89 11:15AMcr/lf
; BUS-004cr/lf
; MEMBERS ON BOARD = 02cr/lf
; 1755971 ROBERT L ONG 3/90cr/lf
; 1234567 JOHN Q PUBLIC 4/90cr/lf
; cr/lf
; cr/lf
; These records will be printed at 300 baud in the GOLD BOOTH.
; The bus unit will retry until it gets through if it
; encounters a busy.
; This offload function is blind and there will be no
```

TABLE I-continued

```
;   acknowledgment that the information was successfully
;   received at the GOLD BOOTH.
;   Actual program code is in TCL (TERMINAL CONTROL LANGUAGE)
;   and it is executed directly by the TRANZ 330 unit. See the
;   TCL Programmer's Manual - VeriFone Part Number 00368 -
;   Revision E - Manual Rev. 6.0.
;   The program PSEUDO-CODE organization is as follows:
;   Power On Initialization              ;VeriFone function
;   Disable KEYPAD                       ;Don't allow interruptions
;   Disable READER                       ;Need positive control of entries
;   Disable DEFAULT FUNCTIONS            ;Kill factory diagnostics for
;   now
;   MAIN:      Clear WORK AREA           ;Packet Buffer - I/O
;   Buffers
;   Reset PACKET COUNTER to zero         ;Nothing to process yet
;   MAIN1:     Call INLOOP               ;Get READER input with
;   back-up timer
;   Check DOOR CLOSED                    ;Is it time to offload?
;        YES = JMP OFFLOAD
;        NO = JMP MAIN1                  ;Keep collecting data
;   INLOOP: Enable READER with back-up TIMER ;Waits for READER
;   input
;   Disable READER                       ;Don't want interruptions just
;   yet..
;   TIMEOUT?                             ;Ten second window
;        YES = Return
;   GOLD CARD FORMAT?                    ;Must have way to know...
;        BAD =     ERROR BEEP → INLOOP
;        GOOD =    Increment PACKET COUNTER ;count new data entry
;                  Move data to PACKET BUFFER ;translate it for
;                  printer
;                  Return
;   OFFLOAD: PACKET COUNTER > 0 ?        ;anything to send?
;        NO = JMP MAIN                   ;all done this pass
;        YES = RETRY COUNT = 0 ?         ;been here before?
;             YES = Set RETRY COUNT ;limit to 3 for now
;                   JMP CALLYARD ;send out the records if able
;             NO = Decrement RETRY COUNT ;show another pass thru
;   CALLYARD:
;   Place CALL                           ;establish path to printer in booth
;   CARRIER DETECT ?                     ;use back-up timer here
;        NO = JMP MAIN1                  ;come back later
;   Call SNDBATCH                        ;now offload the records
;   JMP MAIN                             ;clean up, we're done . . .
;   Return
;   SNDBATCH:
;   Send DATE/TIME                       ;time stamp
;   Send BUS#                            ;identifier of this source of data
;   Send PACKET COUNT                    ;how many we will be sending
;   Send N/L                             ;cr/lf to new line
;   Select PACKET BUFFER                 ;get rid of this batch
;   LOOP1:    Send RECORD                ;offload a record from
;   buffer
;   Decrement PACKET COUNTER ;are we done yet?
;   PACKET COUNTER = 0 ?
;        NO =     Send N/L               ;nope, cr/lf to new line
;                 CALL CHKRDR            ;see if anything new pending
;                 JMP LOOP1              ;go do another record
;   Send WHITE SPACE                     ;yes, separate reports
;   Return
;   WHITE SPACE = N/L N/L N/L
;   CHKRDR:
;   READER pending service ?             ;has a new swipe been made?
;        NO =     Return                 ;nope, skip it
;        YES =    CAPTURE                ;get the data
;                 ANALYZE                ;see if GOLD CARD format
;                     NO = ERROR BEEP
;                     Return
;                 YES =     APPEND
;                           Increment PACKET COUNTER
;                           Return
;   The display on the card reader will alternate between the
;   following two messages in the 16 character display window:
;        HERTZ GOLD ONLY       up for two seconds
;        SLIDE YOUR CARD       up for two seconds
;   Successful card read will receive the following:
;        SUCCESS BEEP TONE.. short, high tone
;        THANK YOU... on the display for two seconds
;        Back to standard display
;   Non HERTZ GOLD cards passed thru the reader will receive the
;   following:
;        ERROR BEEP TONE...long, low tone
```

TABLE I-continued

```
;           NOT HERTZ GOLD    on the display for 2 seconds
;           Back to standard display
;   Improper card read will generate the following:
;           ERROR BEEP TONE...long, low tone
;           PLEASE TRY AGAIN    on the display for two seconds
;           Back to standard display
;   TCL CODE for TRANZ 330 "HERE COMES" application
;   %3E1DU320;TRANZ SOFTWARE VERSION NUMBER WE WILL BE
;   DOWNLOADING INTO THERE ARE TEN SPECIAL REGISTERS WHICH THIS
;   APPLICATION USES AS FOLLOWS:
;   THE RAM SERVES TO CAPTURE AND PRESERVE THE 'VARIABLE'
;   CONTENTS AS ALL OF 'VARIABLES' ARE CLEARED UPON ANY ABORT
;   FUNCTION DURING THIS PROCESS.
;ADDRESS    REG    PURPOSE
;070         0     DOOR CLOSED COUNT-DOWN TIMER
;071         1     WORK-IN-PROGRESS DATA CAPTURE FLAG
;072         2     DATA PACKET COUNTER (MEMBERS ON BUS COUNTER)
;073         3     STORAGE POINTER FOR RECORD COLLECTION INTO BUFFER
;074         4     OFFLOAD POINTER FOR RECORD PRINTOUT
;075         5     COMMUNICATIONS PROCESS MONITOR
;076         6     DISPLAYED MESSAGE NUMBER IDENTIFIER
;077         7     DISPLAY INTERVAL COUNT-DOWN TIMER
;078         8     OUTDIALER ACTIVITY COUNT-DOWN TIMER
;079         9     'CARRIER LOSS' COUNT-DOWN TIMER
;DATA RECORDS ARE COLLECTED AND PREPARED FOR PRINT BEFORE BEING
;STORED
;INTO A RAM BUFFER BEGINNING WITH ADDRESS 420
;THEY ARE OFFLOADED BEGINNING WITH THE RECORD IN 420 FOR 'MEMBER'
;COUNT
019=HERE COMES
;PRESET THE COMMONLY USED PROMPTS
040=HERTZ GOLD ONLY    ;DISPLAYS FOR TWO SECONDS (NORMAL PROMPT)
041=SLIDE YOUR CARD    ;         "           "         "         "
042=NOT HERTZ GOLD     ;ERROR PROMPT UP FOR TWO SECONDS
043=PLEASE WAIT....
;THEN PRELOAD HEADER INFORMATION FOR PRINT ROUTINE
045=BUS #
046=MEMBERS ON BOARD =
;THEN SET BUS NUMBER AND GOLD BOOTH PHONE NUMBER
;THESE LOCATIONS WILL BE FIELD MODIFIABLE FOR INSERTION OF
;CORRECT DATA
048=001
055=4433966
;              TECHNICIAN SETUP INSTRUCTIONS
;ON POWER UP, THE TRANZ WILL DISPLAY ITS INTERNAL CLOCK WHILE
;DOING A FIFTEEN SECOND 'IDLE LOOP' TIMEOUT. AT THE END OF THE
;TIME, THE TRANZ WILL BRANCH TO LOCATION 981 AND EXECUTE THE CODE
;CONTAINED THERE UNTIL ANOTHER POWER DOWN/POWER UP CYCLE.
;DURING THE 'IDLE LOOP', THE TECHNICIAN CAN CAPTURE CONTROL OF
;THE TRANZ BY PRESSING THE 'FUNCTION' KEY AND ENTERING THE BUS
;NUMBER AND THE DIAL OUT TELEPHONE NUMBER INTO THE APPROPRIATE
;MEMORY LOCATIONS.
;THIS IS ACCOMPLISHED WITH 'FUNCTION - 8' AND WILL REQUIRE ENTRY
;OF THE PASSWORD "Z66831" TO ENABLE THE 'STORE' OF DATA.
;PASSWORD ENTRY = Z-ALPHA-ALPHA-6-6-8-3-1
;BUS NUMBER ENTRY = 'STORE WHAT?' 48-ENTER
048=NUMBER-NUMBER-NUMBER-ENTER
;              INCLUDE LEADING ZEROES IN THIS BUS # ENTRY
;DIAL-OUT NUMBER = 'STORE WHAT? 5-5-ENTER
055=NUM-NUM-NUM-NUM-NUM-NUM-NUM-ENTER
;    PRECEDE WITH 1+AREA CODE IF APPROPRIATE
;THE DATE AND TIME CAN ALSO BE SET BY THE TECHNICIAN THROUGH THE
;KEYPAD THIS SAME FIFTEEN SECOND INITIAL ENTRY WINDOW.
;TO SET THE DATE AND TIME, PRESS BOTH "*" AND "3" AT THE SAME
;TIME.
;THE DISPLAY WILL SHOW 'DIAGNOSTICS'. PRESS "ALPHA" AND FOLLOW
;THE SCREEN PROMPTS TO WNTER ALL DATA.
980=5                  ;INFORMATION ENTRY WINDOW PRIOR TO APPLICATION RUN
;MAIN
981S                   ;NORMAL PROCESSING STRING FOR DATA COLLECTION
    +L                 ;LOCK THE KEYBOARD TO PREVENT INTERRUPTIONS
    *L820              ;DO AN INIT IF NEEDED
    *L821              ;DISPLAY NORMAL MESSAGES AND CAPTURE INPUTS
                       ;TWO SECOND DISPLAY WINDOW WITH READER ENABLED
                       ;CHECKS CARD TYPE AND ACCEPTS OR REJECTS INPUT
    *L822              ;SEE IF WE HAD ANY INPUTS AND PROCESS THEM
    *L823              ;OFFLOAD IF POSSIBLE AND CLEAN UP
    L981               ;STAY IN THIS LOOP UNTIL POWER DOWN
;INITIALIZE WORK AREAS
820S
    +A#A6...1          ;HAVE WE DONE AN INIT YET? (FLAG AT ZERO VALUE)
    *M                 ;YES, NON-ZERO FLAG MEANS DONE
```

TABLE I-continued

| | |
|---|---|
| *N#0 | ;NO, ZAP DOOR CLOSED TIMER |
| *N#1 | ;AND SHOW NO WORK-IN-PROGRESS |
| *N#2 | ;AND SET PACKET COUNTER AT ZERO |
| *N#3.420 | ;LOAD STORAGE LOCATION FOR CURRENT RECORD |
| *N#4.420 | ;AND PRESET LOCATION FOR RECORD TO PRINT |
| *N#5 | ;ZAP COMMUNICATION PROCESS NUMBER OF THIS PASS'S FUNCTION |
| *N#6 | ;AND CLEAR MESSAGE ON DISPLAY NUMBER |
| *N#7 | ;ZAP DISPLAY TIMER |
| *N#8 | ;AND DIALER INTERVAL TIMER |
| *N#9 | ;AND CARRIER LOSS TIMER |
| *O#6 | ;NOW SHOW INIT COMPLETED |
| B.4G | ;SAVE THE VARIABLE INITIAL STATES |
| U70 | ;IMAGE OF #0 |
| U71 | ;IMAGE OF #1 |
| U72 | ;IMAGE OF #2 |
| U75 | ;IMAGE OF #5 |
| U77 | ;IMAGE OF #7 |
| U78 | ;IMAGE OF #8 |
| U79 | ;IMAGE OF #9 |
| +Q#3 | |
| U73 | ;IMAGE OF #3 |
| G | |
| +Q#4 | |
| U74 | ;IMAGE OF #4 |
| G | |
| +Q#6 | |
| U76 | ;IMAGE OF #6 |
| *M | |
| ;DISPLAY ;PUT UP MESSAGE ON TRANZ AND CAPTURE INPUTS | |
| 821$ | |
| +A#6.1.1.4 | ;FIRST MESSAGE DUE UP? (JUST INITIALIZED SYSTEM) |
| ;HERE ONLY ONCE AFTER POWER UP TO BEGIN THE DISPLAY SEQUENCE | |
| P40 | ;YES, SHOW 'HERTZ GOLD ONLY' MESSAGE |
| *N#7.3 | ;AND START TIMER GOING (THREE TICKS = TWO SECONDS) |
| *N#6.2 | ;SAY MESSAGE 1 ON DISPLAY |
| L60 | ;GO CHECK FOR INPUTS |
| ;THIS IS PATH FOR ALL OTHER PASSES THRU THIS ROUTINE | |
| +A#5.2.2.2 | ;ARE WE NOW DUMPING THE RECORDS TO THE GOLD BOOTH? |
| P43 ;YES, TELL MEMBERS TO WAIT | |
| *M | |
| *O#7.1..1 | ;DECREMENT DISPLAY TIMER (SKIP JUMP IF ZERO RESULTS) |
| L60 | ;GO CHECK FOR INPUTS |
| +A#6.1.2.4 | ;HERE MEANS TIME TO CHANGE MESSAGE |
| | ;IF MESSAGE ON DISPLAY WASN'T MESSAGE 1, MAKE IT 1 NOW |
| P41 | ;ELSE, CHANGE TO 'SLIDE YOUR CARD ' |
| *N#7.3 | ;AND RESTART THE DISPLAY TIMER |
| *N#6.3 | ;SHOW MESSAGE 2 ON DISPLAY |
| L60 | ;GO CHECK FOR INPUTS |
| P40 | ;RESTORE 'HERTZ GOLD ONLY' TO DISPLAY |
| *N#7.3 | ;RESTART DISPLAY TIMER |
| *N#6.2 | ;SHOW MESSAGE 1 ON DISPLAY |
| L60 | ;GO CHECK FOR INPUTS |
| ;DATACAPTURE | ;MOVES CARD DATA FIELDS TO NEXT OPEN STORAGE SLOT |
| 822$ | |
| +A#1.1..1 | ;IS THERE WORK PENDING TRANSFER TO STORAGE? |
| *M | ;NO, ALL DONE |
| B5.5G | |
| A51 | ;START WITH MEMBER'S ACCOUNT NUMBER |
| R32 | ;FOLLOWED WITH SPACE SEPARATOR |
| A52 | ;THEN HIS NAME |
| A53 | ;AND FINALLY HIS EXPIRATION DATE |
| R13 | ;FOLLOWED WITH CARRIAGE RETURN |
| R10 | ;FOLLOWED WITH LINE FEED |
| +A#2...10 | ;ANYTHING ELSE IN THE BUFFER? (SAVE AS IS IF EMPTY) |
| ;HERE WE WILL EXAMINE THE CONTENTS OF BUFFER FOR A MATCH TO THIS | |
| ;RECORD IF WE DON'T FIND A MATCH, WE WILL SAVE THIS RECORD, ELSE | |
| ;WE'RE DONE | |
| B.4 | ;SELECT WORK BUFFER |
| G | ;CLEAR IT |
| A#4 | ;GET RECORD ON FILE |
| B5.4 | ;SET FOR COMPARISON |
| +C.4 | ;ARE THEY THE SAME? (SKIP X IF TRUE) |
| *O#4 | ;BUMP POINTER TO NEXT RECORD LOCATION |
| I-6.7.#2 | ;REDUCE RECORD COUNT (LOOP BACK TIL ZERO) |
| *L825 | ;RESTORE THE POINTER AND COUNT VALUES |
| I1 | ;AND GO SAVE THIS RECORD |
| L825 | ;JUST RESTORE THE POINTER AND COUNT VALUES THEN DONE |
| B5.5 | ;RESELECT OUR CAPTURED RECORD |

TABLE I-continued

| | |
|---|---|
| U#3 | ;SAVE THIS RECORD FOR PRINT |
| *O#3 | ;BUMP POINTER TO NEXT AVAILABLE SLOT FOR STORAGE |
| *O#2 | ;BUMP THE PACKET COUNTER UP FOR THIS ENTRY |
| *N#1 | ;CLEAR THE WORK IN PROGRESS FLAG |
| G | ;SAVE VARIABLES 2 AND 3 |
| +Q#2 | |
| U72 | |
| G | |
| +Q#3 | |
| U73 | |
| *M | ;RETURN NOW ALL DONE |
| 825$ | |
| B.4G | ;RESTORE OLD COUNT AND POINTER |
| A72 | |
| *Q#2 | |
| A74 | |
| *Q#4 | |
| *N#1 | |
| *M | |
| ;OFFLOAD AND | ;CALLS GOLD BOOTH AND PRINTS RECORDS WHEN DOOR CLOSES |
| | ;STAYS CLOSED FOR TEN SECONDS |
| 823$ | |
| +A#2.1..1 | ;IS PACKET COUNTER GREATER THAN ZERO? |
| *M | ;NO, DONE..NOTHING TO SEND |
| +A#5.1..1 | ;HAVE WE ESTABLISHED COMMUNICATIONS (PRINT IN PROGRESS?) |
| L62 | ;NOT YET, SEE IF IT'S TIME |
| L66 | ;YES, GO TO THAT PROCESS AND CONTINUE |
| ;CHECKINPUT SWIPE | ;LOOKS FOR CARD READER ACTIVITY AND CAPTURES CARD |
| 060$ | |
| *Y1.2.0.0.0.1.0 | ;IF READER ACTIVE, SKIP THE RETURN |
| | ;BASIC TIME SLICE IS HERE WITH 1 SECOND ENTRY WINDOW |
| L80 | ;NO ACTIVITY - SAVE REGISTERS AND RETURN |
| L82 | ;SPECIAL TRAP TO CLEAR OUT MODEM AFTER SENDING DATA |
| B3.3 | ;SELECT INPUT BUFFER |
| G | ;CLEAR IT |
| M | ;GET CARD DATA INTO BUFFER |
| U50 | ;SAVE THE CARD DATA |
| *N#1.8 | ;SET LENGTH OF ACCOUNT NUMBER FIELD |
| I2.1.32 | ;TEST FOR SPACE AS CHARACTER (SKIP AHEAD IF TRUE) |
| I6.3.48 | ;IS CHARACTER VALUE LESS THAN ZERO? (NOT HERTZ) |
| I5.4.57 | ;OR GREATER THAN NINE? (NOT HERTZ) |
| O | ;BUMP EXTRACTION POINTER TO NEXT CHARACTER |
| I-4.7.#1 | ;DO ALL EIGHT CHARACTERS |
| I2.2.31 | ;MUST FIND THE FIELD SEPARATOR HERE OR NOT HERTZ GOLD |
| B3 | ;RESET TO START |
| L61 | ;AND CAPTURE THE ACCOUNT NUMBER |
| P42 | ;ELSE, DISPLAY 'NOT HERTZ GOLD' MESSAGE |
| *N#1 | ;CLEAR DATA READY FLAG |
| *N#7.3 | ;AND RESTART DISPLAY TIMER |
| *N#6.4 | ;SHOW NEW MESSAGE BEING DISPLAYED |
| *G1 | ;SOUND THE ERROR BEEP |
| L80 | ;EXIT SAVING IMAGE OF VARIABLES WE CHANGED |
| ;HERE WE HAVE A GOLD CARD RECORD TO CAPTURE | |
| 061$ | |
| B3 | ;RESET EXTRACTION POINTER TO START OF INPUT BUFFER |
| B.5G | ;SELECT AND CLEAR DESTINATION BUFFER |
| X.31 | ;SAVE ACCOUNT NUMBER |
| U51 | ;FOR LATER ADDITION TO BATCH |
| O | ;STEP OVER FIELD SEPARATOR |
| B.5G | ;SELECT AND CLEAR DESTINATION BUFFER |
| X.32 | ;CAPTURE USER'S NAME AND DELETE TRAILING SPACES |
| X1 | |
| I-2.2.' | ;ARE WE AT END? |
| U52 | ;AND SAVE IT FOR LATER |
| H.31 | |
| O | ;STEP OVER NEXT SEPARATOR |
| B.5G | ;SELECT AND CLEAR DESTINATION BUFFER |
| X5 | ;SAVE THE EXPIRATION DATE FIELD |
| U53 | ;AND KEEP IT HANDY |
| F83 | ;NOW SAY 'THANK YOU' TO USER |
| *G | ;SOUND THE SUCCESS TONE |
| *O#1 | ;SHOW WORK IN PROGRESS (WE CAPTURED SOMETHING) |
| *N#7.3 | ;RESET DISPLAY TIMER |
| *N#6.6 | ;AND DIFFERENT MESSAGE ON SCREEN |
| L80 | ;SAVE REGISTERS AND RETURN |
| ;DOORCLOSE | ;SEE IF THE DOOR IS CLOSED AND START TIMER IF TRUE |
| 062$ | |
| +A#8...1 | ;IS DIALER INTERVAL TIMER CLEARED? (NOT RUNNING) |

TABLE I-continued

| | |
|---|---|
| L63 | ;NO, KEEP TABS ON CALL PROGRESS |
| +A#0.1..1 | ;IS THE DOOR CLOSED TIMER RUNNING? |
| L64 | ;NO, RECHECK THE DOOR POSITION AND START TIMER IF NEEDED |
| *O#0.1.1.1 | ;DECREMENT DOOR TIMER - CONTINUE IF NOW ZERO |
| L64 | ;NOT TIME YET, RECHECK DOOR POSITION |

;HERE WE HAVE DATA TO SEND AND DOOR HAS BEEN CLOSED FOR TEN SECONDS

| | |
|---|---|
| S3 | ;GO OFF HOOK IMMEDIATLY |
| B.5G | ;CHOOSE TRANSMIT BUFFER |
| *W1..3 | ;WAIT ONE SECOND FOR DIAL TONE |
| A55 | ;GET GOLD BOOTH NUMBER |
| +D | ;DTMF DIAL THE GOLD BOOTH NUMBER |
| *N#8.15 | ;SET INTERVAL TIMER FOR BACKUP |
| B.4G | ;UPDATE IMAGE OF 0 AND 8 |
| U70 | ;AS DOOR TIMER HAS TIMED OUT |
| +Q#8 | ;AND DIALER TIMER IS NOW STARTED |
| U78 | |
| *M | ;RETURN |

;CALLPROGRESS  ;MONITORS THE CONNECT SEQUENCE FOR CALL TO GOLD BOOTH
063$

| | |
|---|---|
| I3.7.#8 | ;DECREMENT BACKUP TIMER (SKIP UNTIL ZERO) |
| +K1 | ;DROP THE CARRIER |
| *K3 | ;DROP THE CALL NOW (HANG-UP THE PHONE) |
| L81 | ;AND RESTORE ALL BUT 5, 8 AND 9 |

;HERE WE TEST PHONE'S STATUS AND PROCESS ACCORDINGLY

| | |
|---|---|
| B5.5G | ;SELECT AND CLEAR A DESTINATION BUFFER |
| *V | ;GET TELEPHONE LINE STATUS |
| I9.1.'7' | ;ARE WE STILL DIALING? |
| | ;YES, KEEP THE VIGIL |
| I2.2.'8' | ;ARE WE NOW AWAITING 'ANSWER'? |
| *N#8.15 | ;YES, RESET TIMER FOR THIS INTERVAL |
| I6 | ;AND KEEP WATCHING |
| I5.2.'2' | ;HAVE WE RECEIVED 'CARRIER'? (RETURN IF NOT) |
| +M1.1.2.2 | ;FIRST RESET THE MODEM CHIP |
| *N#8.60 | ;MAXIMUM CALL DURATION TIME |
| +K0 | ;TURN ON CARRIER |
| *W2..3 | ;DO DELAY FOR MODEM TO GET READY |
| *N#5.1 | ;SHOW COMMUNICATIONS ESTABLISHED FOR NEXT PASS |
| *M | ;AND RETURN NOW |

;CHECKDOOR  ;SCANS DOOR POSITION AND STARTS DOOR CLOSED TIMER
064$

| | |
|---|---|
| +R5.3 | ;IS THE DOOR 'OPEN'? |
| +A#0.1..3 | ;IS TIMER ALREADY RUNNING? (SKIP SET, JUST SAVE VALUE) |
| *N#0.10 | ;NO, START THE DOOR CLOSED TIMER |
| I1 | ;SAVE IMAGE AND RETURN |
| *N#0 | ;YES, RESET THE DOOR CLOSED TIMER |
| B.4G | ;SAVE IMAGE OF DOOR TIMER |
| +Q#0 | |
| U70 | |
| *M | ;AND RETURN |

;DATADUMP ;HERE WE WILL DUMP THE RECORDS TO THE PRINTER IN GOLD BOOTH
066$

| | |
|---|---|
| +K7.8 | ;MAKE SURE WE STILL HAVE CARRIER DETECT AND SKIP 8 IF TRUE |
| +A#9.1..2 | ;HAVE WE STARTED CARRIER LOSS TIMER? |
| *N#9.5 | ;NO, SET IT FOR MAX OF TWO SECONDS |
| *M | ;AND MAKE ANOTHER PASS |
| I3.7.#9 | ;DECREMENT CARRIER LOSS TIMER (JUST RETURN IF NOT ZERO) |
| +K1 | ;DROP OUR CARRIER |
| *K3 | ;DROP THE CALL NOW |
| L81 | ;RESTORE VARIABLES EXCEPT 5, 8 AND 9 THEN RETURN |
| *M | ;EXIT IF TIMING CARRIER LOSS |
| *N#9 | ;CLEAR CARRIER LOSS TIMER |
| +A#5.1.1.1 | ;HAVE WE SENT HEADER LINES? |
| L67 | ;NO, SEND HEADER NOW |
| B1.1G | ;SELECT TRANSMIT BUFFER |
| A#4 | ;GET POINTER TO NEXT RECORD TO PRINT |
| +I | ;SEND RECORD OUT TO MODEM |
| *W1..3 | |
| +K7.1 | ;MAKE SURE WE SUCCEEDED IN SENDING THIS RECORD |
| *M | ;NOPE, KEEP IT AROUND |
| I1.7.#2 | ;DECREMENT PACKET COUNTER FOR THIS RECORD DUMP |
| L68 | ;DONE, GO FINISH UP THE PROCESS |
| *O#4 | ;ELSE, BUMP POINTER TO NEXT RECORD TO PRINT |
| B.4G | ;SAVE IMAGE OF 4 |
| +Q#4 | |
| U74 | |

TABLE I-continued

```
    G
    +Q#2            ;AND REMAINING PACKET COUNT VALUE
    U72
    *M              ;AND RETURN
;HERE WE MUST SEND THE HEADER INFORMATION TO THE PRINTER
067$
    *W1..3
    B1.1G           ;SELECT TRANSMIT BUFFER
    R13
    R10
    R13             ;APPEND CARRIAGE RETURN
    R10             ;AND LINE FEED
    J'N'            ;AND DAY OF WEEK
    R' '            ;FOLLOWED WITH SPACES
    J'I'            ;THEN THREE CHAR MONTH
    R' '            ;FOLLOWED WITH SEPARATOR
    J'C'            ;FOLLOWED WITH DAY OF MONTH
    R' '            ;FOLLOWED WITH SEPARATOR
    J'H'            ;FOLLOWED WITH FOUR DIGIT YEAR
    R' '            ;THEN SPACES
    J'DOEOFG'       ;THEN TIME HH:MM:SS(A/P)
    R13             ;THEN CARRIAGE RETURN
    R10             ;THEN LINE FEED
    +I              ;SEND TO MODEM
    *W1..3          ;INSERT SOME PAUSE TIME TO KEEP MODEM ON LINE
    G               ;CLEAR THE BUFFER
    A45             ;GET BUS #
    R' '            ;FOLLOWED WITH SPACE
    A48             ;THEN ACTUAL NUMBER
    R13             ;CARRIAGE RETURN
    R10             ;LINE FEED
    +I              ;SEND TO MODEM
    L69
069$
    B1.1
    G
    A46             ;NOW MEMBERS ON BOARD =
    R' '            ;SPACE
    +Q#2            ;THEN ACTUAL COUNT IN ASCII
    R13
    R10
    +I              ;SEND TO MODEM
    G
    *W1..3
    *O#5            ;SHOW HEADER PRINTED
    *M              ;AND RETURN
;HERE WHEN WE HAVE SENT ALL RECORDS
068$
    B1.1G           ;SEND SOME WHITE SPACE
    R13             ;CARRIAGE RETURN
    R10             ;LINE FEED
    R13
    R10
    +I              ;TO SEPARATE REPORTS ON THE PAGE
    *W1..3
    +K1             ;DROP OUR CARRIER FIRST
    *K3             ;DROP THE CALL NOW
    B1.1G
    R' '            ;NOW PUMP AN EXTRA CHARACTER TO THE MODEM TO FILL ITS
    +I              ;TRANSMIT BUFFER AND CANCEL ITS REQUEST FOR SERVICE
    B.4G            ;NOW REQUEST ANOTHER INIT OF ALL VARIABLES
    U76
    *N#6            ;BY CLEARING INIT FLAG
    *M
;HERE WE SAVE VARIABLE CONTENTS FOR USE AFTER AN ABORT
;SAVE 6 AND 7 CONTENTS FOR MESSAGE DISPLAY INTEGRITY
080$
    B.4G            ;SAVE VARIABLES 6 AND 7 CONTENTS
    +Q#6            ;FOR POSSIBLE RESTORAL BY OTHERS
    U76
    G
    +Q#7
    U77
    *M              ;RETURN
;HERE WE RESTORE ALL REGISTERS AFTER ZAPPING 5, 8 AND 9
081$
    B4.4G
    *N#5
    *N#8
    *N#9            ;CLEAR THE VARIABLES THAT THE ABORT DIDN'T CLEAR
```

TABLE I-continued

```
U75
U78
U79
A70            ;GET RAM IMAGE
*Q#0           ;AND RESTORE THEM
G
A71
*Q#1
G
A72
*Q#2
G
A73
*Q#3
G
A74
*Q#4
G
A76
*Q#6
G
A77
*Q#7
*M             ;RETURN
082$
  +A#5...1     ;ARE WE TALKING TO GOLD BOOTH (=0 SKIP 1)
  L80
  B.2G         ;READ IN MODEM TO CLEAR THE FLAG
  +I5.1..1
  L80
```

I claim:

1. A method of facilitating service to passengers on a bus without driver intervention, including the steps of:
   displaying status messages on a credit card reader located on the bus so that passengers are advised of availability of service;
   receiving in seriation in the credit card reader cards swiped by any passengers on the bus seeking service;
   for each said passenger, reading data from the swiped card, checking said data for errors, placing said data in a predetermined format, and storing the formulated data in an output queue of a buffer memory;
   after a predetermined interval sufficient to permit multiple passengers to swipe credit cards in the card reader, establishing a telecommunications link directly to a printer at a host service location;
   transmitting said credit card data in the output queue to the printer in the order of card swipe sequence, and
   terminating the telecommunications link and reestablishing an appropriate status message on the credit card reader to invite usage from a new group of passengers.

2. The method of claim 1 wherein the establishing step includes establishing a cellular radiotelephone link.

3. The method of claim 2 wherein the transmitting steps includes the further steps of:
   first transmitting predetermined header data, and then transmitting credit card data in the output queue.

4. The method of claim 1 wherein checking said data for errors includes a longitudinal redundancy check, with a further step of aborting the routine being executed in the event an error is detected.

5. The method of claim 1 wherein the status message include a welcome message, and a processing message.

* * * * *